United States Patent [19]

Quan et al.

[11] 4,257,944

[45] Mar. 24, 1981

[54] PROCESS FOR THE MANUFACTURE OF CYANO AZO DYES

[75] Inventors: Peter M. Quan; James S. Hunter; John R. Lawson; John H. Moore, all of Manchester, England

[73] Assignee: Imperial Chemical Industries Limited, London, England

[21] Appl. No.: 24,082

[22] Filed: Mar. 26, 1979

[30] Foreign Application Priority Data

Apr. 5, 1978 [GB] United Kingdom ............... 13324/78

[51] Int. Cl.³ ............................................. C09B 43/00
[52] U.S. Cl. ................................. 260/207.1; 260/152; 260/205; 260/206; 260/207; 260/208
[58] Field of Search ............ 260/152, 208, 205, 207.1, 260/206, 207

[56] References Cited

U.S. PATENT DOCUMENTS

| | | | |
|---|---|---|---|
| 3,821,195 | 6/1974 | Putzig | 260/206 |
| 3,978,040 | 8/1976 | Gottschlich et al. | 260/205 |
| 4,045,430 | 8/1977 | Hamprecht | 260/208 |
| 4,057,563 | 11/1977 | Chalkley | 260/390 |
| 4,083,846 | 4/1978 | Leverenz | 260/207.1 |
| 4,126,610 | 11/1978 | Belfort | 260/205 |

FOREIGN PATENT DOCUMENTS

| | | | |
|---|---|---|---|
| 836028 | 2/1977 | Belgium | 260/208 |
| 2310745 | 9/1974 | Fed. Rep. of Germany | 260/207.1 |
| 1125683 | 8/1968 | United Kingdom | 260/207.1 |
| 1184825 | 3/1970 | United Kingdom | 260/207.1 |
| 1387728 | 3/1975 | United Kingdom | 260/158 |
| 1412922 | 11/1975 | United Kingdom | 260/207.1 |
| 1438374 | 6/1976 | United Kingdom | 260/155 |
| 1444524 | 8/1976 | United Kingdom | 260/207.1 |
| 1449399 | 9/1976 | United Kingdom | 260/207.1 |
| 1529528 | 10/1978 | United Kingdom | 260/208 |

*Primary Examiner*—Floyd D. Higel
*Attorney, Agent, or Firm*—Cushman, Darby & Cushman

[57] ABSTRACT

Process for disperse azo dyes having a cyano radical ortho to the azo group by reacting the corresponding halogeno dye with a covalent non-metallic nitrile in the presence of a copper catalyst and an acid acceptor. Previous processes have used a metal cyanide as the cyanide source. The present process does, however, contemplate the use of a non-metallic nitrile, even in small amounts, in combination with a metal cyanide for which advantages are to be gained in terms of reduced copper usage. The non-metallic nitrile is preferably a cyanohydrin which may be prepared in situ by reacting an aldehyde or ketone with a metal cyanide. The metal cyanide may itself provide the copper catalyst.

8 Claims, No Drawings

PROCESS FOR THE MANUFACTURE OF CYANO AZO DYES

This invention relates to a process for the manufacture of azo dyes having a cyano radical ortho to the azo group and to the dyes obtained therefrom.

It is known to manufacture azo dyes having a cyano radical ortho to the azo group by replacement of the halogen atom in the corresponding halogeno dyestuff with a cyano radical. Previous methods for carrying out this replacement have used a metal cyanide as the cyanide source.

According to the present invention we provide a process for the manufacture of an azo dye having the formula:

$$D—A—N{=}N—B$$

in which A is an aromatic radical, B is the residue of a coupling component and D is a cyano radical ortho to the azo group, which comprises reacting an azo dye of the same formula except that D is a halogen atom with a covalent non-metallic nitrile, or with substances which form such a nitrile under the reaction conditions, in the presence of a copper catalyst and an acid acceptor. The invention also includes the dyes so obtained.

This process is particularly useful for the manufacture of 'disperse' azo dyes which are free of water-solubilising groups.

The aromatic radidal A may be any such radical including heterocyclic radicals. Usually it will be a substituted phenyl radical but the process of the invention is also useful where A is, for example, a benzoisothiazolyl radical or a naphthyl or quinolyl radical.

The radical B may be the residue of any coupling component which couples with a diazo compound to form an azo dye, but the process is particularly effective when B is an N-substituted p-aminophenyl radical.

Dyestuffs which are conveniently prepared by this process are, for instance, those described in German Offenlegungsschrift No. 2724117.

The exchange of cyanide for halogen becomes progressively easier from the chloro through to the iodo dyestuff. Balancing cost with ease of reaction, D in the starting dye is preferably bromine. The process may also be used to exchange two halogeno groups for two cyano groups if both halogeno groups are ortho to the azo link.

By the term "covalent non-metallic nitrile" we mean a nitrile in which the bond securing the cyano group to the residue of the molecule is covalent and in which the cyano group is not directly bonded to a metal atom or ion. Thus we do not exclude the possibility of the nitrile being in the form of a metal salt in which the metal is bonded to the residue of the molecule.

Covalent non-metallic nitriles which have been found particularly suitable are those which have the formula:

G—CN in which G is hydrogen or $$R-\underset{\underset{Y}{|}}{\overset{\overset{X}{|}}{C}}-\ ;$$

X is hydrogen or halogen or $R_1$;

Y is an electronegative group such as halogen, cyano, hydroxyl, alkylsulphonyl, —$COOR_2$, —COOH, —$COR_2$, —CH=$CH_2$ and —CH=$CHR_2$; or X and Y taken together are =NH, =S or especially =O;

R and $R_1$, which may be the same or different, are hydrogen or optionally substituted alkyl, aryl, aralkyl or cycloalkyl groups and $R_2$ is an alkyl group.

Also suitable are metal salts of these nitriles in which the metal is bonded to G when G is not hydrogen. Thus Y may be the alkali metal salt of a carboxylic acid group.

Preferred nitriles are those in which X is hydrogen or $R_1$, and Y is —OH. These nitriles are the cyanohydrins of aldehydes or ketones. For reasons of economy the favoured cyanohydrins are glycollonitrile (formaldehyde cyanohydrin), lactonitrile (acetaldehyde cyanohydrin) and acetone cyanohydrin.

Amongst these, glycollonitrile is especially preferred because of its outstanding stability in the presence of acids. It is surprising that glycollonitrile should function so efficiently in this reaction, because addition of formaldehyde in hot alkaline solution is a recommended and successful method of destroying cyanide ion in waste residues (Ind.Eng. Chem., Prod.Res.Develop. pages 70–75 Vol. 13 1974).

Also useful are dihydro derivatives of aromatic and heteroaromatic compounds which contain a cyano group as a ring substituent. Examples are the Reissert compounds having the formulae:

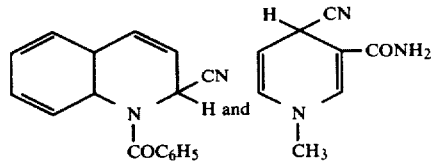

Unless the non-metallic nitrile is used together with a metal cyanide or complex thereof, a hereinafter described, the amount of nitrile will normally be from 1 to 5, and preferably from 1 to 2 chemical equivalents of the replaceable halogen. Larger amounts can be used and if desired the nitrile may provide a solvent medium for the reaction. If a mixture of the cyano- and halo- dyes is required by incomplete reaction then correspondingly less nitrile will be used.

Unlike most metal cyanides the non-metallic covalent nitriles are immediately soluble in organic reaction media.

The copper catalyst may be any copper (I) or copper (II) compound but preferably it is a copper (I) compound. Cuprous chloride, cuprous bromide, cuprous iodide and cuprous cyanide have been found convenient to use. The quantity of catalyst present may be as little as 0.005 moles/mole of dyestuff and will normally be less than 1.0 moles/mole. We have found 0.01 to 0.1 moles/mole to be sufficient in most cases.

The acid acceptor can be any alkaline material, but it is preferred to use organic bases such as pyridine and substituted pyridines, ammonia, triethylamine, triethanolamine or weakly basic metal oxides or weakly basic inorganic salts such as ammonium acetate, disodium hydrogen phosphate, magnesium oxide, calcium carbonate, sodium dihydrogen borate, sodium acetate, sodium carbonate and like materials.

It is also preferred that the acid acceptor is used in the minimum quantity necessary to neutralise the amount of acid present.

The acid acceptor need not be separately supplied but may form part of the non-metallic nitrile. Thus it may be a basic group attached to the nitrile. For example, the nitrile may contain a carboxylic acid group as its alkali metal salt. If the non-metallic nitrile is formed in situ by reacting an aldehyde or ketone with a metal cyanide or complex thereof, then the required acid acceptor is formed simultaneously.

The reaction medium may be water, but it is preferred that an organic solvent is present. The solvent may be used alone or in admixture with water, whether or not this gives a two-phase system. Useful solvents are methyl and ethyl cellosolves, nitrobenzene, anisole, acetophenone, chlorobenzene, butyl acetate, 1,2-dichloroethane, xylene, dimethylformamide and bis(2-cyanoethyl) sulphide.

The reaction may be enhanced by the use of a phase transfer catalyst. This is a substance which being at least partly present in or "wetted" by a first (usually organic) phase, promotes reaction by transferring a reactant from a second (usually aqueous) phase to the first phase to take part in a reaction while itself being released for use in transferring further reactant. Suitable phase transfer catalysts are described in German Offenlegungsschrift No. 2724117.

The reaction is most simply carried out by dissolving or suspending the halogeno dyestuff in the reaction medium together with the copper catalyst, the non-metallic nitrile, the acid acceptor, and the phase transfer catalyst if used, and heating the mixture at 40° to 200° C. until the reaction is complete. The optimum reaction temperature is very dependent on the non-metallic nitrile used, and on the structure of the halogeno dyestuff, but to avoid using pressure equipment it is preferred to work at temperatures not exceeding the normal boiling point of the reaction medium, and to minimise degradation of the dyestuff it is preferred to use reaction temperatures below 130° C. When the non-metallic nitrile is a cyanohydrin, reaction temperatures of 60° to 100° C. are usually employed. The reaction usually take 1 30 hours. The acid acceptor need not be included initially with the reaction ingredients, but may be added slowly throughout the reaction period: frequently this technique gives a purer product, especially where water is a constituent of the reaction medium. The non-metallic nitrile, especially if it has a low boiling point may also be added during the reaction period, either dropwise, or by passing the vapour through the reaction medium.

It is particularly convenient to use a mixture of water and a water-immiscible steam-volatile solvent as the reaction medium. In this case it is advantageous to include a phase transfer catalyst, preferably in the amount of 1-15% of the dyestuff weight, and to add the acid acceptor gradually as reaction proceeds.

After the reaction period, the cyano dyestuff may be isolated by procedures well known in the art. For example, the cyano dyestuff may precipitate from the cooled reaction mixture in which case it may be collected by filtration. Otherwise, the reaction solvent may be distilled, optionally under reduced pressure, or distilled in steam, so as to leave the cyano dyestuff as a residue, or in an aqueous suspension from which it may be collected by filtration. Alternatively the reaction solvent may be diluted with a co-solvent in which the cyano dyestuff has poor solubility, so that preciptiation takes place.

Optionally the copper catalyst may be removed from the cyano dyestuff by suspending the dyestuff in aqueous ammonia, or in a solution of ferric chloride in dilute hydrochloric acid, so as to solubilise the copper. The dyestuff may then be collected and washed. Other techniques for copper removal known in the art may also be used.

It is an advantage of our invention that non-metallic nitriles are safer to use than metal cyanides. Metal cyanides are extremely poisonous and liable to rapid release of hydrogen cyanide gas on exposure to acid. This may be an unacceptable hazard in a dyestuffs works where acid conditions in the works effluent usually predominate and plant costs may be higher than they otherwise would be to deal with it.

Normally cuprous cyanide is the metal cyanide used and this introduces an additional problem of undesirable copper contamination of the dye and effluent. It is, therefore, a further advantage of our invention that considerably less than one chemical equivalent of copper based on the dyestuff is needed to work the process, thereby minimising the copper disposal problem. Even if manufacturing plant allowing the safe use of metal cyanides is available, this feature of the invention is in itself extremely valuable. Thus the non-metallic nitrile may be prepared from the metal cyanide in situ either before or during reaction with the dyestuff in order that a lower charge of copper catalyst may be taken than would be necessary if the metal cyanide were used alone. Indeed this increased performance with very small amounts of copper is obtained if small amounts of the non-metallic nitrile (or substances which are known to give rise to the non-metallic nitrile under the reaction conditions) are present, although the bulk of the cyanide is provided by the metal cyanide. It will be understood, therefore, that the process of our invention includes the use of a non-metalic nitrile in combination with a metal cyanide and moreover the use of a small quantity of a non-metallic nitrile in combination with a large quantity of a metal cyanide.

Where the non-metallic nitrile is to be prepared in situ it is peferred that it should be the cyanohydrin of an aldehyde or ketone because such compounds are readily prepared by mixing metal cyanides with aldehydes or ketones. Glycollonitrile which is especially readily formed from formaldehyde and alkali metal cyanides is particularly favoured.

Thus in a further aspect of our invention we provide a process for the manufacture of an azo dye having the formula:

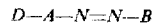

$$D-A-N=N-B$$

in which A and B have the meanings hereinbefore defined and D is a cyano radical ortho to the azo group, which comprises reacting an azo dyestuff of the same formula except that D is a halogen atom, with a metal cyanide, optionally in the form of a complex, and an aldehyde or ketone which combines with the metal cyanide to form a cyanohydrin and an acid acceptor under the reaction conditions, there being present a copper catalyst.

Suitable metal cyanides and complexes thereof are described in British Pat. No. 1529528.

The copper catalyst may be any such catalyst as hereinbefore defined. It may be provided by the metal cyanide or complex thereof where this contains copper.

The invention is illustrated by the following Examples in which parts and percentages are by weight unless otherwise stated.

Example 1

A mixture of the violet dyestuff I (1.5 parts), cuprous iodide (0.6 parts), 2,6-lutidine (0.64 parts) and nitrobenzene (58 parts) is stirred and heated to 95°. A stream of hydrogen cyanide gas in carbon dioxide is bubbled through the mixture, so that after 4 hours, 0.110 parts of hydrogen cyanide have been passed. It is shown by thin layer chromatography that the dyestuff I has been converted into the greenish blue dyestuff of formula II. The nitrobenzene is distilled in steam and the dyestuff is collected by filtration of the residual aqueous suspension and washed.

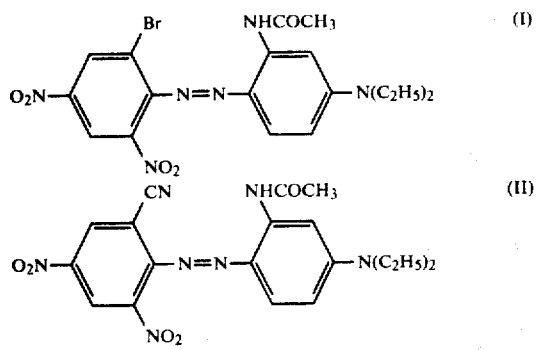

Example 2

A solution of the reddish blue dyestuff of formula III in which X is Br (1.2 parts) in dimethyl formamide (50 parts), is added to a stirred mixture of cuprous bromide (1.1 parts), sodio-malonitrile (2.64 parts), water (6 parts) and dimethyl formamide (110 parts), and this mixture is stirred and heated for 12 hours at 70°. It is then found by thin layer chromatography that conversion to the greenish blue dyestuff of formula III in which X is CN is complete. The reaction mixture is cooled and diluted with water (200 parts), and the dyestuff is collected, washed with water and dried. The yield is 1.2 parts.

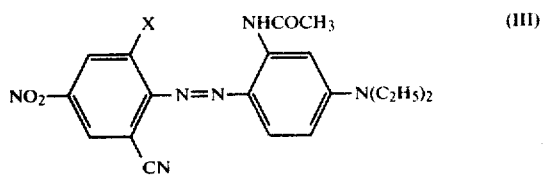

Example 3

A mixture of the dyestuff of formula I (4.79 parts), cuprous bromide (0.14 parts), lactonitrile (1.42 parts), sodium acetate (1.7 parts) and 2-ethoxyethanol (45 parts) is stirred and heated to 90°–95°. After 35 minutes, conversion to the dyestuff of formula II is complete. The mixture is cooled to ambient temperature when the dyestuff of formula II precipitates and is collected by filtration. The yield is 83% of theory and the dyestuff is of excellent purity.

Example 4

379 parts of an aqueous filter paste containing 95.8 parts of the dyestuff of formula I, is stirred with anisole (150 parts), water (218 parts) and cetyl trimethyl ammonium bromide (9.3 parts). Cuprous bromide (1.44 parts) and glycollonitrile (17.5 parts of a 70% aqueous solution) are added, and the mixture is heated and stirred at 95°–100° under reflux. A solution of sodium carbonate (12.8 parts) in water (74 parts) is added evenly dropwise during 2 hours, and while this addition is taking place the vapours above the refluxing mixture are analysed for hydrogen cyanide. It is found by thin-layer chromatography that the dyestuff I has been converted into dyestuff II, and that less than 2% of the dyestuff I remains, and that $0.16 \times 10^{-6}$ parts of hydrogen cyanide have been evolved (0.0003% of nitrile groups employed). The mixture is stirred and heated for a further 0.5 hours and the anisole is distilled in steam and recovered from the distillate. The analysis for hydrogen cyanide is continued during this period and again it is found that a negligible amount has been evolved. The aqueous suspension of dyestuff (II) is cooled to 65° and the dyestuff is collected by filtration and the filter paste is stirred with aqueous ammonia (450 parts of a 14% solution) for 20 hours. It is again collected, washed with water, and dried. The yield is 86.4% of theoretical.

Good results are obtained when the cetyl trimethyl ammonium bromide is replaced by tetrabutyl ammonium bromide, and when the sodium carbonate is replaced by an equivalent amount of sodium or ammonium acetate or triethanolamine. Excellent results are obtained if the sodium carbonate is replaced by sodium dihydrogen borate.

Example 5

Compared with Example 4, this example illustrates the improvement obtainable by reduction of the usage of acid acceptor even when the usage of copper catalyst is reduced to 0.01 mole per mole of dyestuff.

The dyestuff of formula I (52.8 parts of dried filter paste of 90.7% purity), cetyl trimethyl ammonium bromide (4.7 parts), water (238 parts), anisole (77 parts), glycollonitrile (8.20 parts of a 70% aqueous solution) and cuprous bromide (0.143 parts) are stirred together and heated to 95° under reflux for 0.5 hour. A solution of anhydrous sodium carbonate (5.72 parts) in water (45 parts) is then added evenly during 2 hours, and stirring and heating are continued for 1 hour further. The anisole is removed by distillation in steam and the mixture is cooled to 65° and filtered. The filter cake is washed with water and dried. The yield of dyestuff of formula II is determined from the extinction coefficient of the dried product and found to be 95.6%.

Example 6

The dyestuff of formula I (52.8 parts of dried filter paste of 90.7% purity), cetyl trimethyl ammonium bromide (4.7 parts), water (245 parts), anisole (77 parts) and formaldehyde (0.76 parts of 37% aqueous solution) are stirred and heated to 80° and the pH is adjusted to between 6.5 and 7.0. The mixture is heated to 95° under reflux and a solution prepared by dissolving sodium cyanide (4.85 parts) and cuprous cyanide (0.090 parts) in water (45 parts) is run in evenly during 2 hours, and stirring and heating are continued for 1 hour further. The mixture is worked up as in Example 5 and the yield of dyestuff of formula II is found to be 88.4%.

The experiment is repeated, but without addition of the formaldehyde. The yield is 81.5% of theoretical.

We claim:

1. In a process for the preparation of an o-cyanoazo dyestuff by reaction of the corresponding o-halogenazo dyestuff with a nitrile, the improvement which comprises employing as the nitrile a compound of the formula:

G—CN in which G is hydrogen or $$R-\underset{Y}{\overset{X}{\underset{|}{C}}}-$$

X is hydrogen or halogen or $R_1$, Y is halogen, cyano, hydroxyl, alkyl sulphonyl, —COOR$_2$, —COOH, —CH=CH$_2$, or —CH—CHR$_2$, wherein R$_2$ is alkyl, or X and Y taken together are =NH, =S or =O, and R and R$_1$, which are the same or different are hydrogen, alkyl, aryl, aralkyl or cycloalkyl, or an alkali metal salt of said nitrile in which the alkali metal is bonded to G when G is not hydrogen; in the presence of a copper catalyst and an acid acceptor.

2. A process as claimed in claim 1 in which the nitrile is a Reissert compound having the formula:

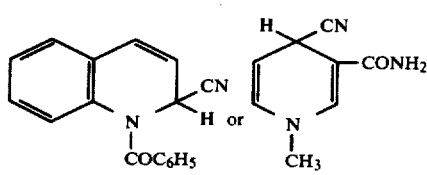

3. A process as claimed in claim 1 in which the amount of copper catalyst used is from 0.01 to 0.1 moles/mole of dyestuff.

4. A process as claimed in claim 1 in which the acid acceptor is an organic base, or a weakly basic metal oxide or weakly basic inorganic salt.

5. A process as claimed in claim 1 in which the acid acceptor is used in the minimum quantity necessary to neutralize the amount of acid present.

6. In a process for the preparation of an o-cyanoazo dyestuff by reaction of the corresponding o-halogenoazo dyestuff with a metal cyanide or complex thereof, the improvement which comprises employing in said reaction, in the presence of a copper catalyst, an aldehyde or ketone which combines with said metal cyanide or complex thereof to form a cyanohydrin and an acid acceptor.

7. A process as claimed in claim 6 in which the copper catalyst is provided by the metal cyanide or complex thereof which contains copper.

8. A process as claimed in claim 6 in which said aldehyde or ketone has the formula $$R-\underset{}{\overset{X}{\underset{}{\diagdown}}}C=O$$

wherein X is hydrogen or halogen or $R_1$ and R and $R_1$, which are the same or different, are hydrogen, alkyl, aryl, aralkyl or cycloalkyl.

* * * * *